Jan. 21, 1958     R. GUNN     2,820,947

ELECTRIC FIELD METER

Filed April 29, 1955

INVENTOR
Ross Gunn

BY Arthur Vinograd ATTORNEY

United States Patent Office 2,820,947
Patented Jan. 21, 1958

2,820,947

ELECTRIC FIELD METER

Ross Gunn, Washington, D. C., assignor to the United States of America as represented by the Secretary of Commerce Application April 29, 1955, Serial No. 505,067

3 Claims. (Cl. 324—72)

The present invention relates to electric field meters and more particularly to a locked-in electric field meter constructed to operate satisfactorily under extreme conditions of precipitation.

In meteorological work, fundamental investigations of the electric state of the atmosphere require detailed information as to the distribution in space of the electric field. Meters suitable for measuring the atmospheric electric field for the purposes of detecting the approach, presence, or withdrawal of a storm have been known to the prior art for many years. One such device is disclosed in a patent issued to the present inventor entitled, "Thunderstorm or Electric Field and Potential Indicator," Patent No. 1,919,215, issued July 25, 1933. These earlier electric field meters have been quite satisfactory in non-precipitating areas but have systematically failed to operate when exposed to heavy rain or other severe meteorological conditions. One such meter employed a moving synchronous contact which frequency accumulated dirt or got out of adjustment. The present invention provides an improved electric field meter having increased reliability and accuracy under severe operating conditions.

One object of this invention is to provide an improved electric field meter.

Another object of this invention is to provide an electric field meter capable of satisfactory operation under severe meterological conditions.

A further object of this invention is to provide a locked-in electric field meter.

A still further object of this invention is to provide an electric field meter having no mechanical contacts.

A final object of this invention is to provide a locked-in electric field meter capable of operating satisfactorily under severe weather conditions having no breaking mechanical contacts.

Electric field meters of the type considered here employ electrostatic induction to provide a signal which may be amplified by vacuum tubes and used to operate a meter. Consider a conducting sphere immersed in a horizontal conducting plane and assume that the sphere of radius $a$ is lifted vertically above the plane a distance H. If a fine wire connects the sphere and plane, a charge will be induced on the sphere which is the product of its capacity and the potential at its new position. Assume that a uniform vertical electric field is maintained over the conducting plane, and therefore the potential of the sphere at height H, will be $$\rho = -EH \qquad (1)$$

where E is the vertical electric field. The capacity of the above sphere at a distance H above the conducting plane is given nearly enough by $$C_a = \frac{a}{1 - \frac{a}{2H}} \qquad (2)$$

when the charge Q induced on the sphere by the transfer of the latter from inside the conducting plane to its final position is $$Q = \left[\frac{aH}{1 - \frac{a}{2H}}\right] E \qquad (3)$$

It is evident that this charge will be positive if the sphere sees a negative charge overhead, and negative if the overhead charge is positive. It should be clear, further, that if the sphere is cyclically raised and lowered to the assumed position, a charge will flow to and from the sphere with a period equal to the period of its elevation. Moreover, the current through the fine conducting wire connecting the sphere to the horizontal plane will be alternating in character and of the same frequency. Practically, the raising and lowering of the sphere cannot be accomplished easily, and it has been found expedient to adopt, instead, a light insulated aluminum rod provided with an eye on each end and which is rotated on a motor shaft about its center in a plane parallel to the direction of the electric field. It is clear that this rotating rod will have charges induced on it of the magnitude somewhat comparable to those given by Equation 3. The apparatus is constructed so that the two ends of this rotating rod can each emerge from a deep slot or shield once during every revolution and hence, a charge variation is induced thereon which is twice the frequency of rotation $n$. Now, if the inductor rod is highly insulated and connected to the grid of a vacuum tube having a high impedance input, it is clear that an alternating potential of maximum value V will be impressed on the grid which is given by $$V = \frac{FaH}{\left(1 - \frac{a}{2H}\right)} \frac{E}{C_c} \qquad (4)$$

where $C_c$ is the combined capacity of the inductor, the grid of the vacuum tube and the connecting wires, and F is a design constant depending upon the specific geometry of the rotating conductor.

If the relaxation time of the electrical circuit between the grid and ground is made long compared to the period of rotation $(1/n)$, that is, if $RC \gg 1/n$, then the charge induced on the inductor system does not have time to leak off of the highly insulated inductor to ground, and the signal potential on the grid is changed principally as a result of the cyclic increase and decrease of the capacity of the rotating system. Such an arrangement is particularly adapted for a system employing alternating current throughout.

Other uses and advantages of the invention will become apparent upon reference to the specification and drawings in which.

Figure 1:
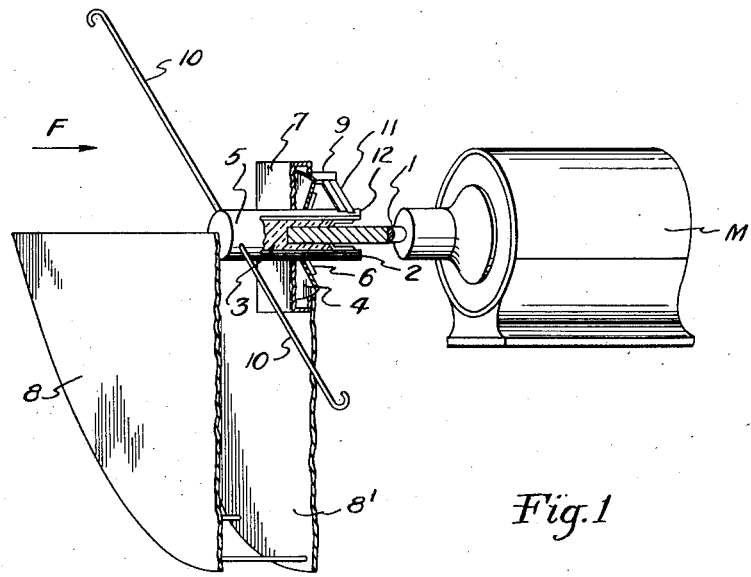
Fig. 1 shows the inductor assembly of the present invention.

An inductor 10 is mounted on the shaft 1 of a small battery-operated motor M, and it is rotated at a constant speed in a plane parallel to an electric field indicated as F in Fig. 1. The inductor 10 conveniently consists of a light conducting rod 12 inches long with loops in each end, and is securely attached to the motor shaft at its midpoint. The inductor is arranged to rotate in a deep slot defined by the half shields 8—8' in such a way that the two ends successively emerge from the shield, become exposed to the electric field to be measured, and then recede into the shielded slot. Now if this inductor is highly insulated and there is an appreciable electric field, a charge will be induced on the inductor each time that either half of the inductor is exposed to the electric field. According to the principles outlined above, an alternating potential is produced which may be sufficiently amplified to operate a meter. Synchronous rectification is further employed so that the amplified signal may be applied to a direct current meter. By the use of synchronous rectification, the output signal is phase sensitive and a reversal in the applied electric field appears as a reverse reading on the meter. The relation between the meter reading and the electric field is, moreover, nearly linear. It is clear, therefore, that such a circuit provides a convenient means for measuring the magnitude and sign of the electric field to which the rotating inductor is exposed.

The present invention further provides for the elimination of the difficulties and irregularities inherent in synchronous rectifiers of the contact-commutator type by employing the principles of a locked-in amplifier. In this type of circuit, a small alternating current generator, having a 4-pole permanent magnet field structure, is mounted on the same shaft as the inductor, and is used to supply the circuit reference voltage. This 4-pole generator is designed to deliver about 2 volts output and obviously will produce a frequency of twice the rotational frequency. Hence, it provides the A. C. voltage necessary to synchronize or "lock-in" with the signal delivered by the rotating inductor.

Provisions are made to insulate the rotating inductor from the motor shaft and a collector ring is attached in such a way that the inductor is in continuous contact with the grid of the first amplifying tube. The location of all critical insulation inside the dry case of the instrument is an important design consideration. The specific design of the combined inductor and collector ring is shown in Fig. 1. In this figure, 1 is the motor shaft which drives a metallic hub 5 on which an inductor 10—10 is mounted. The hub 5 as shown is in the form of a cylinder and provides a seal so that moisture cannot enter the insulated areas. Between the motor shaft 1, and the metal hub 5, a Bakelite spool 3 is pressed and locked to the shaft by a set screw (not shown). The entire inductor assembly is thereby insulated from the shaft and its inner surface 12 where leakage due to moisture might occur, is further carefully protected from outside rain by the shields 8—8', the right-hand one 8' as shown in the drawing also generally forming one end of a drive motor case (not shown) which completely encloses drive motor M. An insulated brush holder 9 and brush 11 are provided as shown to make continuous contact with the inductor. Outside the case end 8', a housing 7 is built which encloses the circular baffle 4. This circular baffle is attached to the hub by the collar 6 and rotates with the inductor assembly. If, during heavy rain, droplets succeed in entering the cavity of housing 7 they strike first the baffle 4 and are thrown to the walls by centrifugal action. Thus, although the clearance between the housing 7 and the hub 5 must be at least ⅛ inch, to prevent raindrops from shorting the inductor, the inner clearance between the casing end 8' and the hub 5 may be kept quite small.

The problem and structure which overcomes it is as follows. The hub 5 projecting from the combination shield and casing end 8' is spaced therefrom to provide an air gap which electrically insulates the hub from the casing end. However, in heavy rain water collects on hub 5 and manages to get through this spacing and along the hub to surface 12 where it tends to cause a short between hub 5 and shaft 1. In the present invention a housing 7 is provided which is supported from casing end 8'. Housing 7 is spaced at least ⅛ inch from hub 5 but encloses a circular baffle 4 which is attached to hub 5 by collar 6 and adapted to rotate with hub 5. The baffle plate 4 in conjunction with collar 6 and housing 7 forms what is called a slinger ring. As the water enters the cavity of housing 7 along hub 5 it strikes baffle plate 6 and is thrown out to the end walls of cavity 7 by means of the centrifugal force imparted to it from rotating baffle plate 6. The water may then run down the walls of housing 7 and out through a hole (not shown) provided in the bottom of housing 7 if so desired. In this way hub 5 remains spaced from the enclosing structure and yet no moisture manages to reach surface 12 of hub 5. By the adoption of such a construction, it has been found practical to operate these electric field meters for hours in the heaviest rain or even with a garden hose turned on the inductor system.

Figure 2:
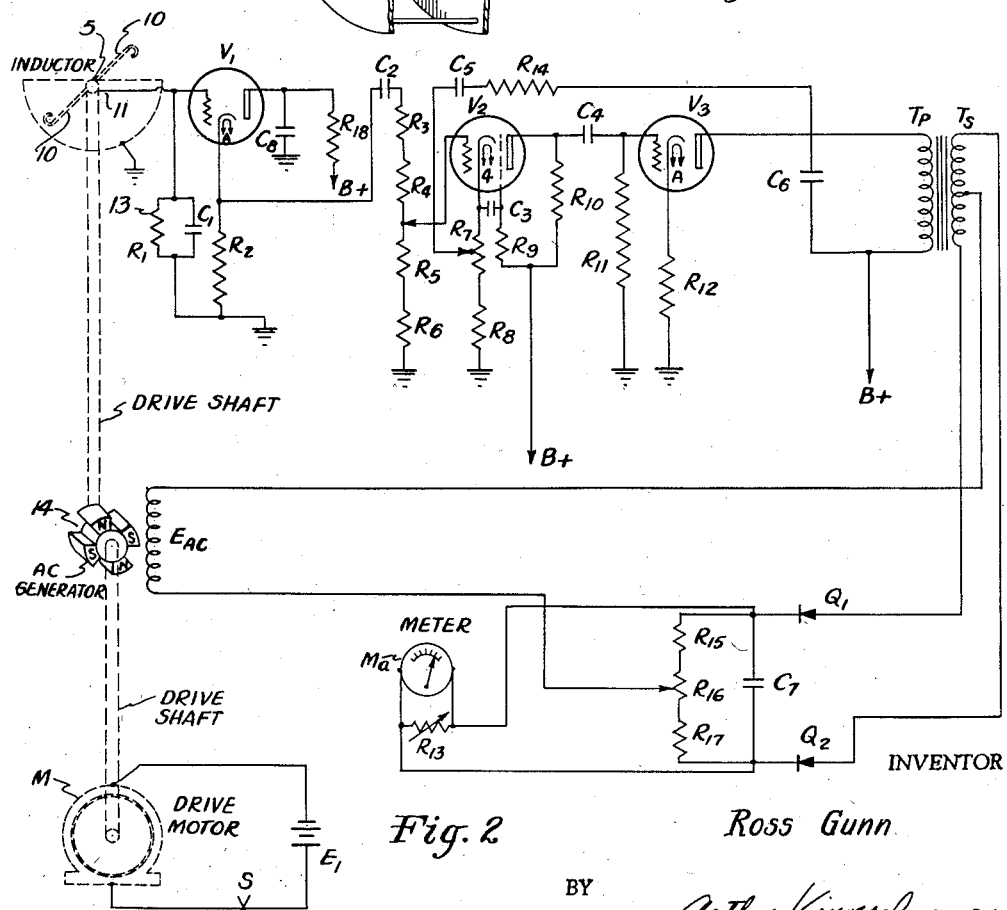
Fig. 2 shows the circuit diagram of the electric field meter of the present invention.

The complete circuit diagram for an alternating current electric field meter suitable to cover all ranges between 1 volt/cm. and 4000 volts/cm. is given in Fig. 2. This circuit employs the referred to locked-in amplifier feature and an attenuator which permits selection of an appropriate sensitivity. The inductor 10 is connected to the grid of the first amplifier tube V–1 by means of the brush contacts 11. The input to this first tube is shunted by an appropriate RC circuit, having a time constant greater than the inductor rotational period. The first tube V–1 is connected in a cathode follower circuit, adapted to respond without overloading over a wide range of applied potentials. The tube is coupled into an attenuator consisting of a potentiometer including the resistances R–3, R–4, R–5, and R–6 and an adjustable wiper to select the desired range. This attenuator feeds additional amplifier stages, V–2, V–3 and the output of the final stage is arranged to provide negative coupling with resulting circuital stability through a second potentiometer R–7. The amplifier is of the classical type and needs no special discussion. The output of the last stage V–3 is provided with a step-down transformer $T_p$—$T_s$ whose high-impedance primary is shunted by condenser C–6 selected to tune the output transformer to the approximate frequency provided by the rotating inductor 10. This was found necessary because the available commercial transformers do not operate very satisfactorily at the low frequencies usually employed. The secondary $T_s$ of the output transformer is center-tapped as shown in Fig. 2 and connected to one side of the referred to A. C. reference voltage provided by the auxiliary generator 14 carried on the same shaft as the inductor. This A. C. generator consists of a simple 4-pole permanent magnet pressed on the shaft 1 of the driver motor M, and provided with surrounding windings designed to give an output of about 2 volts. The other side of the A. C. reference voltage provided by the generator 14 is connected to a balancing network comprising potentiometer R–15, R–16, and R–17. The outer terminals of the output transformer secondary $T_s$ connect to a branched rectifier circuit including two matched low impedance germanium rectifiers, Q–1 and Q–2, which are shunted by a large capacitor C–7 and a direct current microammeter $M_a$.

The drive motor M consists of a small 6-volt motor connected to a storage battery and a switch S as shown in Fig. 2. The motor is usually operated at a speed of about 1500 R. P. M. and thus gives an operating frequency of about 50 cycles.

It should be clear from Fig. 2 that if the amplifier does not pass on an output signal, and if the return from the synchronizing generator 14 is at the midpoint of the potentiometer R–15, R–17, then during half of the A. C. cycle, the current will be equally divided through the rectifiers Q–1 and Q–2. In such event, the sensitive meter $M_a$ will show no reading. However, if a signal of appreciable amplitude is manifested at the primary $T_p$ of the output transformer it is clear that additional voltages will be added on half of the transformer secondary $T_s$ while a contrary voltage is applied across the other half. In such circumstances, more current will flow through one rectifier than through the other and the D. C. meter $M_a$ will indicate the degree of unbalance. Such meter-reading is closely proportional to the signal from the amplifier and hence, the impressed electric field. A reversal in phase of the signal will be indicated by a reversal in the reading of the meter. Such a phase-sensitive device is free of the irregular behavior of the contacts employed in a conventional synchronous converter and ideal for outdoor purposes.

The inductor and preamplifier may be mounted at a considerable distance from the control panel, while the attenuator for changing the sensitivity can be incorporated in the control box. Therefore, all necessary adjustments are conveniently at hand during operation.

Experience has suggested that the best way to mount the present electric field meter is to construct a copper screen about five feet square on a wooden form that will maintain the top of the inductor slot flush with the screen. The screen is grounded and serves as a reference plane through which the rotating inductors are exposed and shielded.

Another flat screen of similar shape mounted on a frame that can be supported parallel to the first one and a known distance above it serves as a means for obtaining a known electric field for calibration. The spacing between frames should not be less than ⅓ of their width. Known voltages between the screens may be applied over sufficiently wide range to calibrate the field meter. The electric field in the intervening space is then given by $$E = -V/S \qquad (7)$$

where V is the applied voltage as measured by a good voltmeter, and S is the spacing of the parallel screens. For best accuracy, the applied voltages should be great enough to reach all electric fields that require accurate measurement. However, if the attenuator resistors are accurately calibrated, the fields can be determined by calibration over a limited range and the use of a calculated multiplier.

The electric field is invariably proportional to the meter reading if proper operating potentials are maintained in the amplifier circuit. Two important adjustments are necessary, and although they need to be made but once, the adjustment should be correct. Minor adjustments of the sensitivity and negative feed back to the amplifier may be had by changing the slider on potentiometer R-7. Of course, the larger variations in sensitivity are controlled by selecting the appropriate position of the wiper connected to the attenuator R-3, R-4, R-5, and R-6. The phasing of the potential supplied to the rectifiers, Q-1 and Q-2 is critical. Phasing is normally accomplished by changing the relative angular position between the A. C. field magnets on the generator in relation to the position of the inductor. Although this adjustment is not difficult, it must be done carefully and may be found only by experiment. It is evident that if the signal from the amplifier is not in proper phase with respect to the voltage applied across the balancing network, then the basic principles of the lock-in amplifier cannot operate and the equipment will fail or be unstable in its performance.

It will be apparent that the embodiments shown are only exemplary and that various modifications can be made in construction and arrangement within the scope of the invention as defined in the appended claims.

What is claimed is:

1. An electric field meter comprising a rotating rod having loops on each end, shaft means connected through insulation to the midpoint of said rod, driving means coupled to said shaft means, means for successively exposing each end of said rod to the field to be measured over approximately 180° of the rotation of said rod, brush means coupled to said rod for obtaining an alternating electrical signal therefrom, an A.-C. generator coupled to said shaft for rotation therewith to produce a reference signal in synchronism with said alternating electrical signal, a transformer coupled to said brush means through amplifier means, the secondary of said transformer having a center tap and having each end coupled through a rectifier to a corresponding end of a balancing resistor, an adjustable contact on said resistor, one side of said generator output being coupled to said center tap; the other side of said generator output being coupled to said adjustable contact and meter means connected to said resistor for determining the net D.-C. signal through said resistor.

2. An electric field meter comprising rotating shaft means, means for driving said shaft, inductive rod means having a loop on each end connected at its midpoint through insulating means to said rotating shaft means, means for successively exposing each half of said rod means to the electric field to be measured over approximately 180° of rotation of said shaft, brush means coupling each half of said rod means to an A.-C. amplifier, said amplifier being coupled to the primary winding of a transformer, the secondary winding of said transformer having a center tap, an A.-C. generator connected to said shaft to rotate therewith and produce a reference signal in synchronism with the output from said inductor means, said center tap being connected to one side of the output from said generator, a rectifier connecting the ends of said secondary winding to opposite ends of a balancing resistor, an adjustable sliding contact coupled to the center of said resistor, the other side of the output from said generator being coupled to said sliding contact, and D.-C. meter means connected across said resistor for registering the unbalance signal across said resistor.

3. A field meter as defined in claim 2 including slinger ring means on said shaft between said rod means and said shaft driving means.

References Cited in the file of this patent

UNITED STATES PATENTS

| 1,429,227 | Dubilier | Sept. 19, 1922 |
| 2,181,946 | Lindenblad | Dec. 5, 1939 |
| 2,248,405 | Freeman | July 8, 1941 |
| 2,400,112 | Greibach | May 14, 1946 |
| 2,449,068 | Gunn | Sept. 14, 1948 |
| 2,462,172 | Esarey | Feb. 22, 1949 |
| 2,490,579 | Clewell | Dec. 6, 1949 |
| 2,516,984 | Havenhill et al. | Aug. 1, 1950 |
| 2,662,191 | Okey | Dec. 8, 1953 |